(12) United States Patent
Cahill et al.

(10) Patent No.: US 10,901,975 B2
(45) Date of Patent: Jan. 26, 2021

(54) SYSTEMS, METHODS, AND COMPUTER-READABLE MEDIA FOR IMPROVED CONCURRENCY OF USERS OF A SHARED VIRTUAL ENVIRONMENT

(71) Applicant: Microsoft Technology Licensing, LLC, Redmond, WA (US)

(72) Inventors: Jason Matthew Cahill, Woodinville, WA (US); Michael Weilbacher, Redmond, WA (US); Jonathan Martin Ortiz, San Antonio, TX (US); Sergey Ivanovich Bykov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 314 days.

(21) Appl. No.: 15/976,982

(22) Filed: May 11, 2018

(65) Prior Publication Data
US 2019/0349444 A1    Nov. 14, 2019

(51) Int. Cl.
*G06F 16/00*    (2019.01)
*G06F 16/23*    (2019.01)
*G06F 16/487*    (2019.01)

(52) U.S. Cl.
CPC ........ *G06F 16/2315* (2019.01); *G06F 16/487* (2019.01)

(58) Field of Classification Search
CPC ... H04L 67/2833; H04L 65/403; H04L 67/38; H04L 67/28; H04L 67/42; H04L 69/16;
(Continued)

(56) References Cited

U.S. PATENT DOCUMENTS

| | | | |
|---|---|---|---|
| 2017/0072323 A1* | 3/2017 | Malenfant | A63F 13/355 |
| 2018/0060461 A1* | 3/2018 | Whitehead | G06F 9/5083 |

(Continued)

OTHER PUBLICATIONS

Knutsson et al.,"Peer-to-Peer Support for Massively Multiplayer Gannes",IEEE,pp. 96-107 (Year: 2004).*
(Continued)

*Primary Examiner* — Alexander Khong
(74) *Attorney, Agent, or Firm* — Ray Quinney & Nebeker; James Bullough (57) ABSTRACT

Systems, methods, and computer-readable storage devices are disclosed for improved concurrency of users of a shared virtual environment. One method including: transmitting, to each single player client of, chunks of world chunk data of a shared virtual environment; receiving, at one or more virtual environment servers from each single player client connected to the shared virtual environment, state data of each user of a respective single player client connected to the shared virtual environment, wherein the single player client of each user manages state data of the user within the one or more virtual environment servers; periodically monitoring, from each user of the single player client connected to the shared virtual environment, updated state data for the user of a respective single player client connected to the shared virtual environment; storing, for the shared virtual environment in a database connected to one or more virtual environment servers, the updated state data for each user of the single player client; and periodically transmitting, for each user of the single player client, the updated state data of other users of the single player client within a predetermined distance of the user of the single player client.

20 Claims, 8 Drawing Sheets

(58) Field of Classification Search
CPC ...... H04L 65/4084; A63F 13/58; A63F 13/35; A63F 13/822; G06F 16/256; G06F 16/2315; G06F 9/45558; G06F 2009/45595; G06F 16/487
See application file for complete search history.

(56) References Cited

U.S. PATENT DOCUMENTS

2019/0095560 A1\* 3/2019 Lewis ................... G06F 9/5083
2019/0246146 A1\* 8/2019 Bustamante ............ H04L 67/38

OTHER PUBLICATIONS

Almroth, D., "Pikko Server, Scalability when using Erlang on the server side for massive multiplayer game servers," Erlang User Conference 2010, Stockholm, 27 pages.
Östman, A., "Non-centralized distributed algorithm to locate nearby servers based on player positions for a MMOG server cluster," KTH, School of Information and Communication Technology (ICT), 2015, 65 pages.

\* cited by examiner

SYSTEMS, METHODS, AND COMPUTER-READABLE MEDIA FOR IMPROVED CONCURRENCY OF USERS OF A SHARED VIRTUAL ENVIRONMENT

TECHNICAL FIELD

The present disclosure relates to a network architecture for controlling a shared virtual environment, such as a simulators and/or video games. In particular, the present disclosure relates to a single player client connecting to a shared virtual environment that allows for an increased number of concurrent users of the shared virtual environment.

INTRODUCTION

In a virtual environment designed for a single user using a single player client, the virtual environment may not be able to scale for multiple users using respective single player clients for a shared virtual environment. Further, when multiple users share the shared virtual environment, systems and/or servers may not be able support in real-time a large number of concurrent users and/or objects in the shared virtual environment. For example, the systems and/or servers may rely on a single instance of the virtual environment, running on one or more computing systems and/or virtual computer systems, to host the entire shared virtual environment. The multiple users of the shared virtual environment may encounter reduced real-time interaction, and the problems may compound as more and more users attempt to connect to the shared virtual environment.

Further, as multiple users traverse the shared virtual environment and interact with objects in the shared virtual environments, the multiple users may assemble at a small shared region within the shared virtual environment. As the multiple users gather at the small shared region within the shared virtual environment, the computing resources running on the one or more computing systems and/or the virtual computer systems may be overloaded, and the virtual environment my not run in real-time and/or may freeze.

To alleviate congestion, traffic of users of the shared virtual environment may be distributed across multiple proxies, and then the traffic may be coalesced to a single server. However, in such a game-centric server design, a single server would need to process all user states to manage the shared virtual environment. The single server's ability to receive, send, and/or process all data for all users may be a limiting factor. Accordingly, there is a need to create a player-centric design of a shared virtual environment rather than a game-centric server design.

SUMMARY OF THE DISCLOSURE

According to certain embodiments, systems, methods, and computer-readable media are disclosed for improved concurrency of users of a shared virtual environment.

According to certain embodiments, a computer-implemented method for improved concurrency of users of a shared virtual environment. One method including: transmitting, to each single player client of a plurality of single player clients, chunks of world chunk data of a shared virtual environment; receiving, at one or more virtual environment servers from each single player client of the plurality of single player clients connected to the shared virtual environment, state data of each user of a respective single player client connected to the shared virtual environment, wherein the single player client of each user manages state data of the user within the one or more virtual environment servers; periodically monitoring, from each user of the single player client of the plurality of single player clients connected to the shared virtual environment, updated state data for the user of a respective single player client connected to the shared virtual environment; storing, for the shared virtual environment in a database connected to one or more virtual environment servers, the updated state data for each user of the single player client of the plurality of single player clients; and periodically transmitting, for each user of the single player client of the plurality of single player clients, the updated state data of other users of the single player client within a predetermined distance of the user of the single player client.

According to certain embodiments, a system for improved concurrency of users of a shared virtual environment. One system including: a data storage device that stores instructions for improved concurrency of users of a shared virtual environment; and a processor configured to execute the instructions to perform a method including: transmitting, to each single player client of a plurality of single player clients, chunks of world chunk data of a shared virtual environment; receiving, from each single player client of the plurality of single player clients connected to the shared virtual environment, state data of each user of a respective single player client connected to the shared virtual environment, wherein the single player client of each user manages state data of the user; periodically monitoring, from each user of the single player client of the plurality of single player clients connected to the shared virtual environment, updated state data for the user of a respective single player client connected to the shared virtual environment; storing, for the shared virtual environment in a database, the updated state data for each user of the single player client of the plurality of single player clients; and periodically transmitting, for each user of the single player client of the plurality of single player clients, the updated state data of other users of the single player client within a predetermined distance of the user of the single player client.

According to certain embodiments, a computer-readable storage device storing instructions that, when executed by a computer, cause the computer to perform a method for improved concurrency of users of a shared virtual environment. One method of the computer-readable storage devices including: transmitting, to each single player client of a plurality of single player clients, chunks of world chunk data of a shared virtual environment; receiving, at one or more virtual environment servers from each single player client of the plurality of single player clients connected to the shared virtual environment, state data of each user of a respective single player client connected to the shared virtual environment, wherein the single player client of each user manages state data of the user within the one or more virtual environment servers; periodically monitoring, from each user of the single player client of the plurality of single player clients connected to the shared virtual environment, updated state data for the user of a respective single player client connected to the shared virtual environment; storing, for the shared virtual environment in a database connected to one or more virtual environment servers, the updated state data for each user of the single player client of the plurality of single player clients; and periodically transmitting, for each user of the single player client of the plurality of single player clients, the updated state data of other users of the single player client within a predetermined distance of the user of the single player client.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

In the course of the detailed description to follow, reference will be made to the attached drawings. The drawings show different aspects of the present disclosure and, where appropriate, reference numerals illustrating like structures, components, materials and/or elements in different figures are labeled similarly. It is understood that various combinations of the structures, components, and/or elements, other than those specifically shown, are contemplated and are within the scope of the present disclosure.

Moreover, there are many embodiments of the present disclosure described and illustrated herein. The present disclosure is neither limited to any single aspect nor embodiment thereof, nor to any combinations and/or permutations of such aspects and/or embodiments. Moreover, each of the aspects of the present disclosure, and/or embodiments thereof, may be employed alone or in combination with one or more of the other aspects of the present disclosure and/or embodiments thereof. For the sake of brevity, certain permutations and combinations are not discussed and/or illustrated separately herein.

Again, there are many embodiments described and illustrated herein. The present disclosure is neither limited to any single aspect nor embodiment thereof, nor to any combinations and/or permutations of such aspects and/or embodiments. Each of the aspects of the present disclosure, and/or embodiments thereof, may be employed alone or in combination with one or more of the other aspects of the present disclosure and/or embodiments thereof. For the sake of brevity, many of those combinations and permutations are not discussed separately herein.

DETAILED DESCRIPTION OF EMBODIMENTS

One skilled in the art will recognize that various implementations and embodiments of the present disclosure may be practiced in accordance with the specification. All of these implementations and embodiments are intended to be included within the scope of the present disclosure.

As used herein, the terms "comprises," "comprising," "have," "having," "include," "including," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal." Additionally, the term "or" is intended to mean an inclusive "or" rather than an exclusive "or." That is, unless specified otherwise, or clear from the context, the phrase "X employs A or B" is intended to mean any of the natural inclusive permutations. For example, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

For the sake of brevity, conventional techniques related to systems and servers used to conduct methods and other functional aspects of the systems and servers (and the individual operating components of the systems) may not be described in detail herein. Furthermore, the connecting lines shown in the various figures contained herein are intended to represent exemplary functional relationships and/or physical couplings between the various elements. It should be noted that many alternative and/or additional functional relationships or physical connections may be present in an embodiment of the subject matter.

Reference will now be made in detail to the exemplary embodiments of the disclosure, examples of which are illustrated in the accompanying drawings. Wherever possible, the same reference numbers will be used throughout the drawings to refer to the same or like parts.

The present disclosure generally relates to, among other things, a methodology for improved concurrency of users, using respective single player clients, connected to a shared virtual environment. Embodiments of the present disclosure may achieve one thousand or more concurrent users in a shared virtual environment without altering a single player client. For example, embodiments of the present disclosure may achieve one thousand or more concurrent users in a multiplayer Minecraft game without altering the Minecraft client.

Each user of a single player clients may connect to a third-party server, such as Minecraft server, to share a virtual environment. Users who operate the third-party server may not have access to source code of the single player client, and therefore, may be required to interface with the single player client via an official network protocol defined by a developer of the single player client.

For each user of the shared virtual environment, a single player client application may be running on a computer of the user. The single player client may communicate over a network using a protocol. For example, the client may communicate over the network using one or more of User Datagram Protocol ("UDP"), Transmission Control Protocol ("TCP"), WebSocket protocol, etc. In some embodiments of the present disclosure, network data may be one or both compressed and/or encrypted. In embodiments discussed below, a TCP connection may be established as a WebSocket connection to provide a well-defined, light-weight, higher-level protocol. However, embodiments discussed herein, are not limited to any particular protocol. For example, a particular client may be written in a particular type of source code having an implementation for a WebSocket client. The client connect to a virtual environment server to receive packets from one or more other clients connected to the virtual environment server over a predetermined protocol. The client may then, for example, decrypt, decompress, and/or forward packet along to a WebSocket endpoint, such as a virtual environment server.

Figure 1:
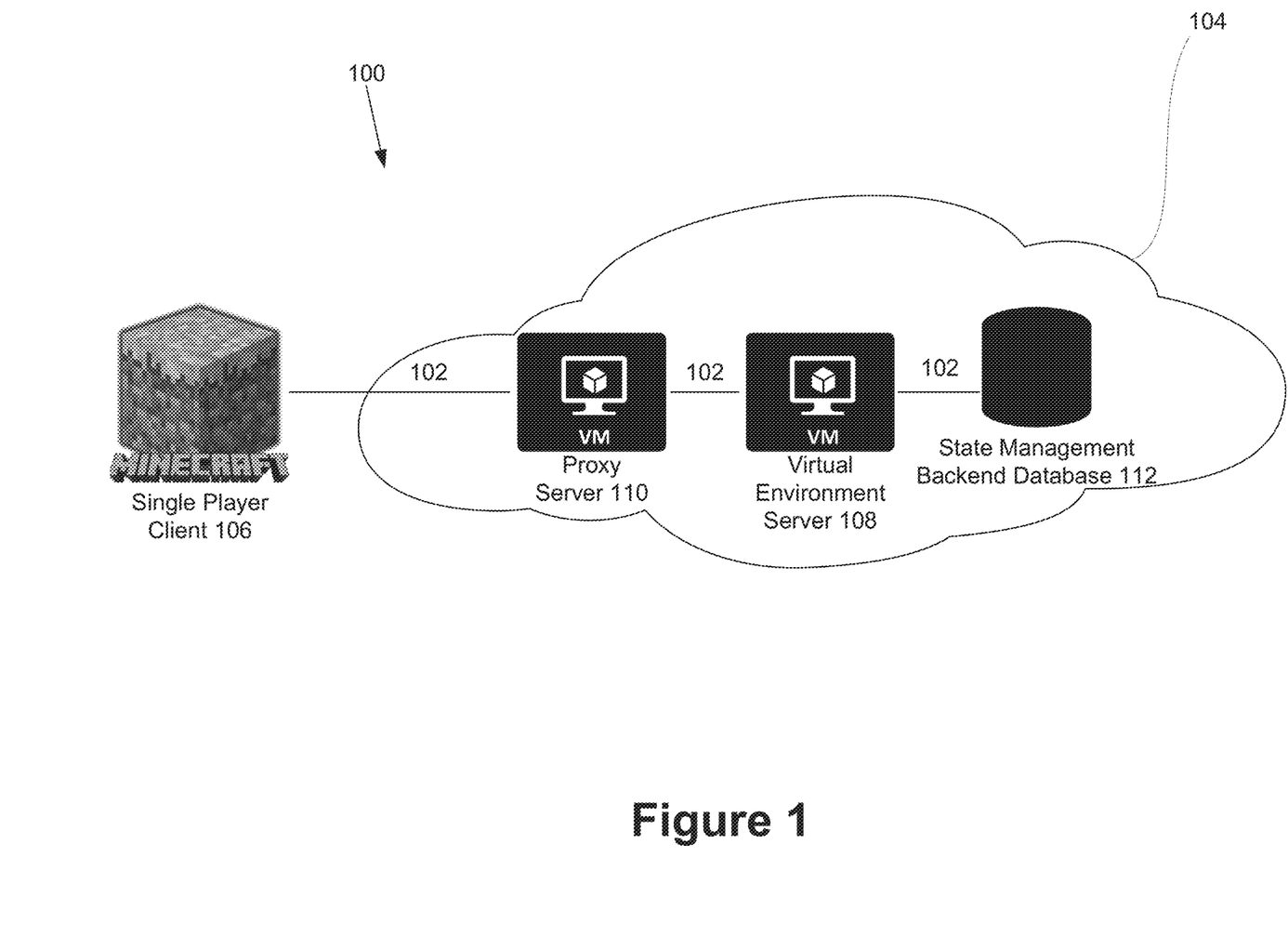
FIG. 1 depicts a structure of a virtual environment architecture 100, according to embodiments of the present disclosure.
Figure 2:
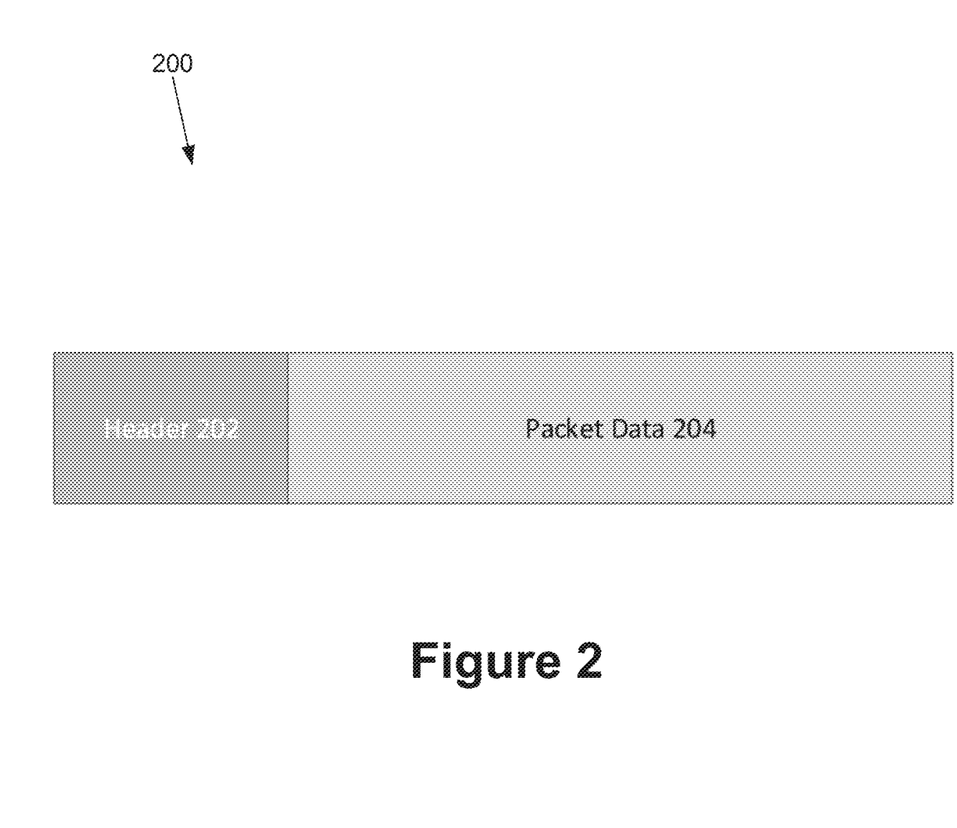
FIG. 2 depicts a proxy server routing packet 200, according to embodiments of the present disclosure.

FIG. 1 depicts a structure of a virtual environment architecture 100, according to embodiments of the present disclosure. Packet traffic 102 over the virtual environment server may travel within a data center 104 to remain intrinsically secure. Further, the virtual environment architecture 100 may include a proxy server 110 between a single player client 106 and a virtual environment server 108. Before a proxy server 110 forwards packets to the virtual environment server 180, the proxy server 110 may add a header 202 (FIG. 2) to packet data 204. The header 202 may include a client identifier and/or routing information to inform the virtual environment server 108 how to send packets back to the originating single player client 106 through the proxy server 110. FIG. 2 depicts a proxy server routing packet 200, according to embodiments of the present disclosure.

In embodiments of the present disclosure, the virtual environment server 108 may connect to a plurality of proxy servers 110, and the virtual environment server 108 may handle all interaction with a respective single player client 106. For example, the virtual environment server 108 may manage a state of each connected single player client 106 for server authoritative features to provide the single player client 106 with necessary information, such as world chunk data, needed for the single client 106 to function correctly.

According to embodiments of the present disclosure, world chunk data may be controlled by the virtual environment server 108. The virtual environment server 108 may oversee sending each single player client 106 world chunks that each single player client 106 may need to render the virtual environment around a player of the single player client 106. The virtual environment server 108 may implement a predetermined virtual environment and/or may control generation of a random virtual environment server during execution of the virtual environment. When a predetermined virtual environment is used, world chunk data may be load from storage, such as a state management backend database 112. In a distributed system of virtual environment servers 108, world chunk data may be copied to each instance of the virtual environment server 108.

For shared virtual environments with a player-centric design, each player of a single player client 106 may only be concerned with relevant information about the shared virtual environment as it pertains to the specific user of the single player client 106. Thus, the virtual environment server 108 may manage a subset of the virtual environment for that player of the single player client 106. The heuristic for relevancy may be a proximity to the player of a single player client 106 measured in chunks. Chunks may be defined on a two dimensional plane. As the player of the single player client 106 moves, a cylindrical volume of relevancy moves relative to the player of the single player client 106, which may add and/or cull other players of relevance.

Chunk data may also be described as a bounded region of the virtual environment. The virtual environment, comprising world chunk data, may be divided into a plurality of chunks, and the virtual environment may be a one or more dimensional virtual environment. A person of ordinary skill in the art will appreciate that a virtual environment and chunks may comprise one or more dimensions, as may be specified by a virtual environment developer. For example, a one dimensional virtual environment may be a line and a chunk may comprise a portion of the line. In another example, the virtual environment may be a three dimensional virtual environment, and a chunk may comprise a three dimensional segment of the three dimensional virtual environment. For example, the three dimensional segment may include one or more of a cube, a sphere, and/or any three dimensional shape. Each chunk may comprise data of content within the chunk.

Within the virtual environment, locations and a quantity of one or more players in the shared virtual environment may change. Thus, data of content within the chunk may also change in associate with the one or more players located within the chunk.

In exemplary embodiments, a virtual environment may have 1,000 concurrent players in the shared virtual environment, and each player would have a subset of the other players reported to them based on the cylindrical volume of relevancy.

A strength of switching from a game-centric design to a player-centric design is that the player-centric design allows for a distributed architecture of a plurality of virtual environment servers 108. In order to implement the plurality of virtual environment servers 108, a common backend between all virtual environment servers 108 may be required to manage states of all players and affinitize players based on position for an efficient lookup. Discussed in detail below are embodiments for implementing a common backend.

To enable the common backend, a set of interfaces may be defined for communicating with the common backend.

A world client interface may be used to interface with a state management backend. The state management backend may centralize world chunk data. The world client interface may be used to establish a connection and query world chunk data. For example, embodiments of the present disclosure may load all world chunk data from a disk. Below is exemplary code for a world client interface:

```
public interface IWorldClient
{
    Task<FeedbackMessage> Initialize(string worldName);
    Task<LevelChunk> GetChunk(int x, int z);
}
```

A player client interface may manage a state of a player within the backend. The player client interface may include a plurality of functions, such as initialize, update, and/or leave. An initialize function may create a state entry for the player within the backend and may register an observer to receive asynchronous updates that are relevant to the player. An update function may write a new state for the player within the backend. The player update may either overwrite an existing record or migrate a record if necessary. A migration may occur when a player has moved to a new world chunk since the last update. The migration may include writing the record to the new world chunk and deleting the existing record from the previous chunk. The leave function may delete the record from the backend. Below is exemplary code for a player client interface:

```
public interface IPlayerClient
{
    Task<FeedbackMessage> Initialize(IPlayerObserver playerObserver, PlayerInfo state);
    Task<FeedbackMessage> Update(PlayerInfo physicalState);
    Task<FeedbackMessage> Leave( );
}
```

A player observer interface may be a callback used by the backend to notify a player instance managed by the virtual environment server 108 about changes relevant to the player. Below is exemplary code for a player observer interface:

```
public interface IPlayerObserver
{
    void Update(BlockInfo[ ] blocks, PlayerInfo[ ] players);
}
```

Figure 3:
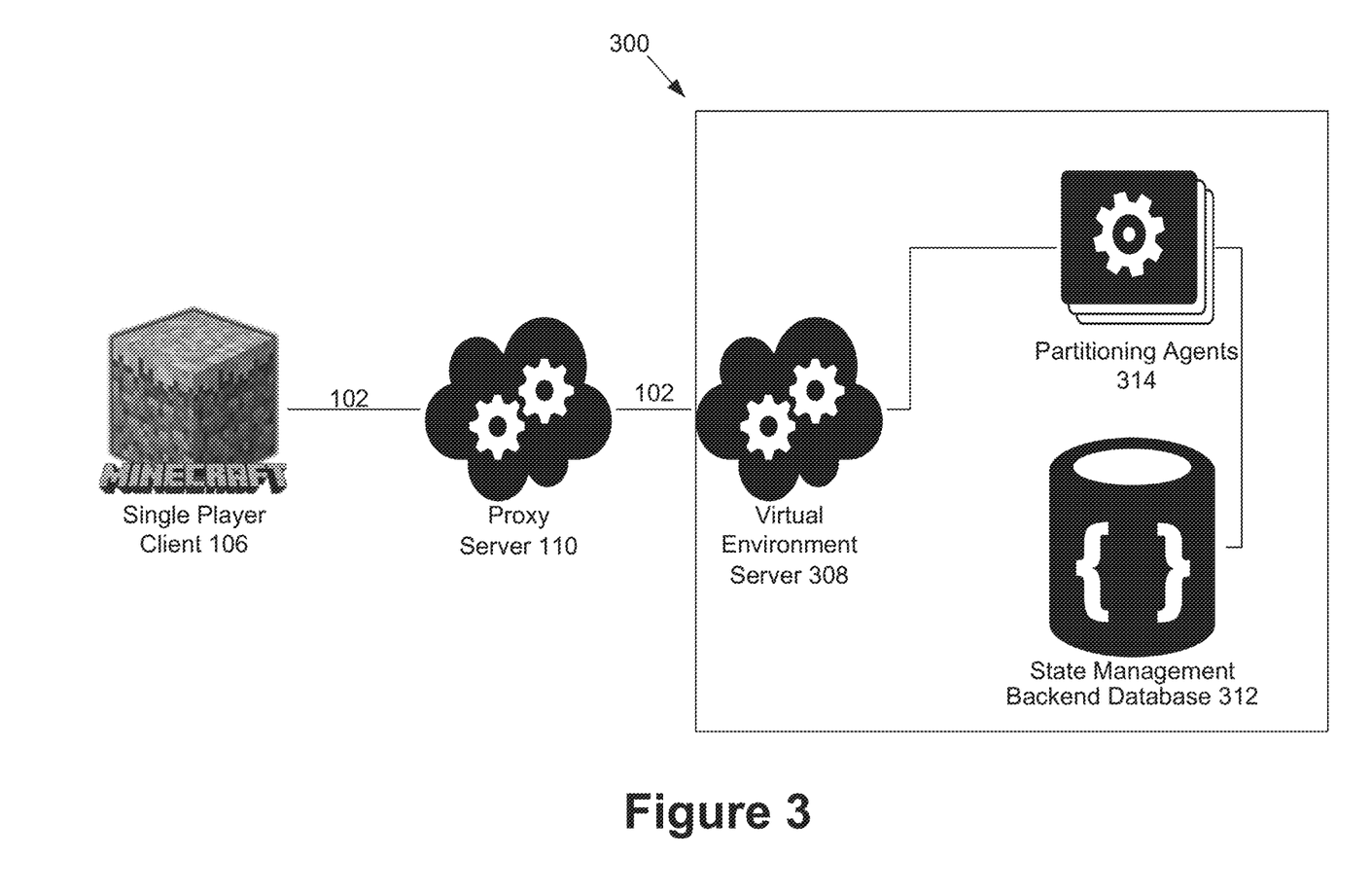
FIG. 3 depicts a structure of the virtual environment architecture 300 with a first type common backend, according to embodiments of the present disclosure.

FIG. 3 depicts a structure of the virtual environment architecture 300 with a first type common backend, according to embodiments of the present disclosure. A type first common backend (sometimes referred to as "Cosmos") may write entries for a database 312 across a series of partitions via a virtual environment server 308 and partitioning agents 314. Queries to the database 312 may be optimized by writing records with like affinity to the same partition. If each record entry is a player state, then there may be a relationship between partitions and world chunks. Queries to the database 312 may be easily derived from the world chunks of interest. If a static chunk radius is assumed while using the first common backend, a better quality of service may be guaranteed. A smaller static radius may result in fewer queries to the database 312. However, a smaller static radius must be reasonably set to not significantly impact a user experience. Accordingly, a partition radius of 1 with a partition to chunk ratio of 1:3 may provide a user of the single player client 106 with enough information about the virtual environment around the user and still may provide a feeling of a crowded virtual environment because other users up to 3 chunks away in every direction may be seen.

To meet the requirements above, the state management backend database 312, such as an Azure Cosmos database, may be capable of handling 180,000 queries per second. 180,000 queries per second may be calculated from taking a maximum players to support (such as 1,000 respective players connected by 1,000 respective single player clients 106) times ticks per second of each player (such as 20 ticks per second for each player) times a number of queries performed each tick by each player for changes to the partitions around the player including the one the player is currently on (such as 9 queries performed each tick by each player).

Figure 4:
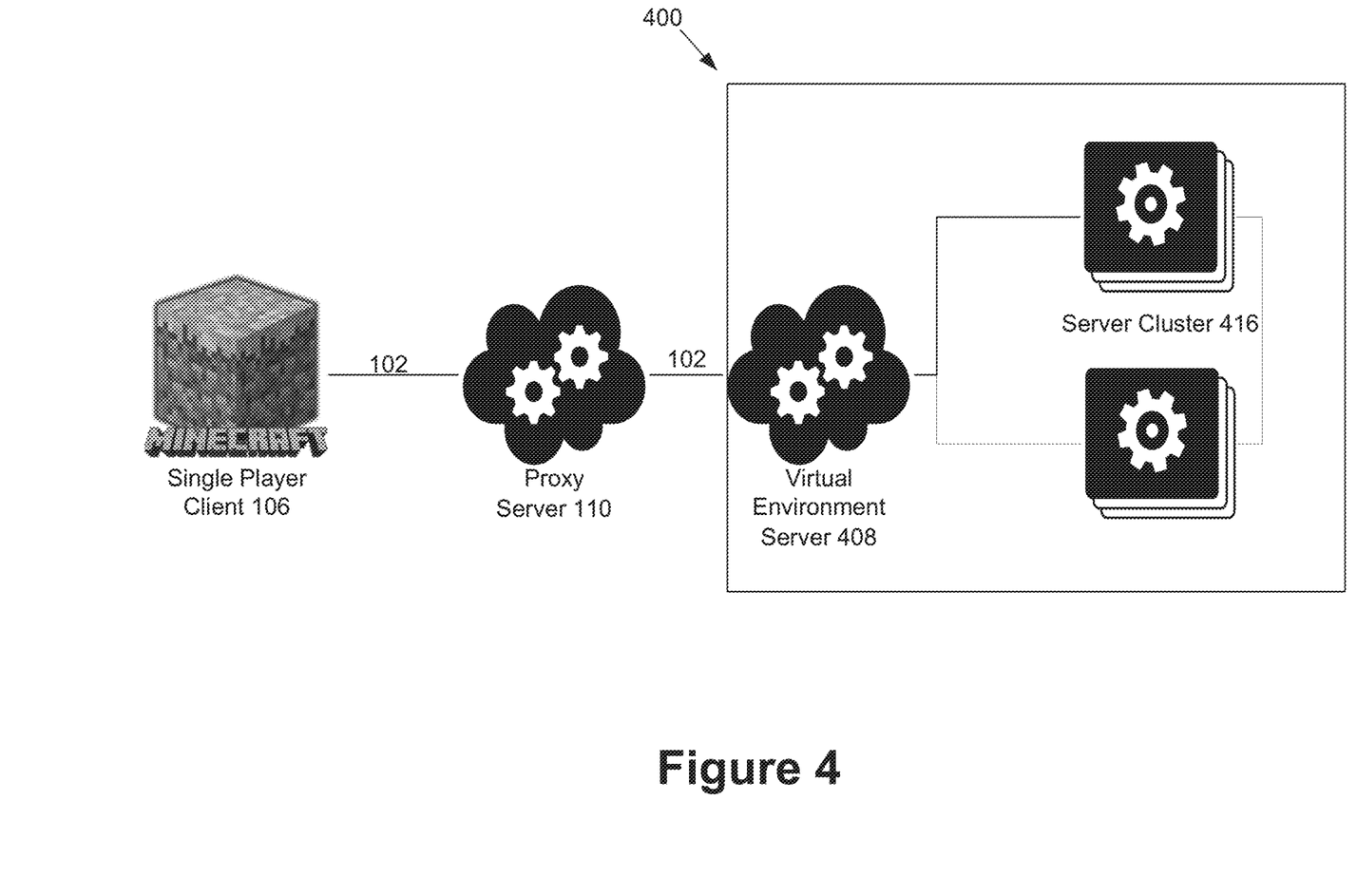
FIG. 4 depicts a structure of the virtual environment architecture 400 with a second type common backend, according to embodiments of the present disclosure.

FIG. 4 depicts a structure of the virtual environment architecture 400 with a second type common backend, according to embodiments of the present disclosure. The virtual environment architecture 400 may be a framework that provides a straightforward approach to building distributed high-scale computing applications. The virtual environment architecture 400 may work similar to a real-time database. The virtual environment architecture 400 may manage objects/actors in a server cluster 416 via a virtual environment server 408, and the virtual environment architecture 400 may handle concurrency within the server cluster 416. As mentioned above, the virtual environment architecture 400 may be a cluster of interconnected application servers that host individually addressable objects ("actors"). Each object may receive and process incoming messages, and send messages to other objects and to client proxies. A plurality of objects may run in the server cluster 416 and virtual environment server 408 may manage their efficiency within the server cluster 416. An object may allow an application to register callbacks with the virtual environment architecture 400 so that the application may be notified when a client, such as single player client 106, receives updates about other relevant objects.

In embodiments of the present disclosure, three distinct types of objects may be used including a world actor, a chunk actor, and a player observer. There may be a single world actor per virtual environment serviced by a given server cluster 416. The single world actor may include high-level information about the virtual environment, such as a size of the virtual environment. Additionally, the single world actor may allow an application to write state information to the virtual environment architecture 400.

A plurality of chunk actors may exist, each chunk actor corresponding to a chunk of the virtual environment in use by a user of a single player client 106. When a user of a single player client 106 initializes their connect to the virtual environment with the second type common backend, the user of the single player client 106 may register their player observer with the corresponding chunk actor of the chunk the user is starting on in the virtual environment. The chunk actor may maintain a collection of all users of respective single player clients 106 currently located within the chunk of the virtual environment. Additionally, each chunk actor may allow an application to write state information to the virtual environment architecture 400. A player observer may allow the virtual environment architecture 400 to communicate back to the applicant, such as the single player client 106, via the virtual environment server 408.

The chunk actor may maintain associations to chunks within a view radius of all users of respective single player clients 106 such that when changes occur on itself or associated chunks, the chunk actor may notify all player observers associated with the chunk. As with the virtual environment architecture 300, the virtual environment architecture 400 may query changes at a predetermined interval. The predetermined interval may be, for example, every 30 seconds. However, a person of ordinary skill in the art may use any time interval as needed. For each elapsing of the predetermined interval, changes may be queried and all associated users of respective single player clients 106 may be notified of the change, which enable the player-centric design of embodiments of the present disclosure.

By implementing one of the virtual environment architectures discussed above, improved concurrency of users of a shared virtual environment may be obtained. Further, the above-described virtual environment architectures may be analyzed to determine an amount of collocated user that can be supported within the same view radius and to determine an amount of concurrent players that may be supported by the virtual environment architectures.

To determine an amount collocated players that may be support in the same view radius by the virtual environment architectures, a baseline of an approximate average network latency alone of a roundtrip packet in the virtual environment architectures may be a predetermined value, such as 72 milliseconds. In other words, a minimum of 72 milliseconds may pass for a user A to see movement of a user B. For example, an average network latency between a single player client 106 and the nearest virtual environment server may be about 33 milliseconds. An average network latency between virtual machines collocated in the nearest virtual environment server may be about 1.5 millisecond. Then, by tracing the route along the virtual environment architecture for a change of one user to reach another, a minimum of 72 milliseconds may pass for a user A to see movement of a user B.

The virtual environment architecture 400 may support up to 70 concurrent users of respective single player clients 106 constantly and simultaneously moving within a same view radius and with minimal noticeable latency in user updates. Under these conditions, the following was measured over a single player client 106, such as a Minecraft client, connection to a proxy server, such as proxy server 110, a burst rate of 14 packets per second totaling 756 bytes per second, 0% packet loss, the single player client was ticking at a smooth 20 times per second (50 milliseconds), and an average latency of the connection was aligned with the baseline for the connection (~33 millisecond). The above-described measurements may indicate that the network was not under strain for the workload and the single player client was not under strain to support 70 concurrent users within view. The cause of the latency in user updates may be from the virtual environment server performance and/or in a server cluster.

The virtual environment architecture 300 may support up to 15 concurrent users of respective single player clients 106 constantly and simultaneously moving within a same view radius and with minimal noticeable latency in user updates. Under these conditions, the following was measured over a single player client 106, such as a Minecraft client, connection to a proxy server, such as proxy server 110, a burst rate of 13 packets per second totaling 702 bytes per second, 0% packet loss, the single player client was ticking at a smooth 20 times per second (50 milliseconds), and an average latency of the connection was aligned with the baseline for this connection (~33 millisecond). The above-described measurements may indicate that the network was not under strain for the workload and the single player client was not under strain to support 15 concurrent users within view. The cause of the latency in user updates may be from the virtual environment server performance and/or in the database. Thus, the latency noticed in the single player client may not be related to the network connection between the client and proxy.

Figure 5:
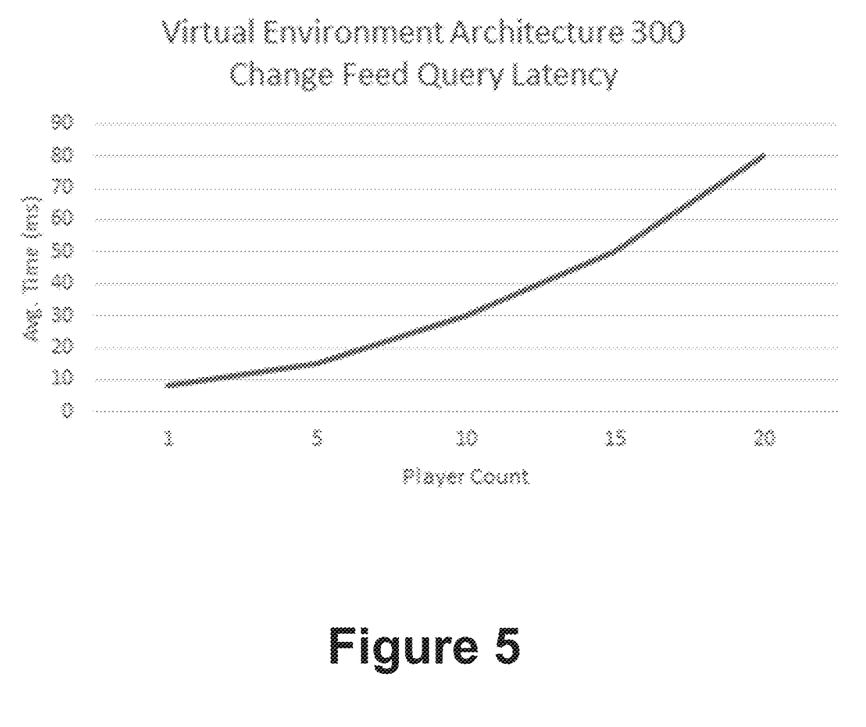
FIG. 5 depicts a graph of change feed query latency per a user count, according to embodiments of the present disclosure.

The virtual environment architecture 300 may be tested by measuring performance of the change feed queries. These queries may be done asynchronously. However, as a number of users of single player clients increased, latency of the query increased. FIG. 5 depicts a graph of change feed query latency per a user count, according to embodiments of the present disclosure. Based on the trending latency of the queries, more optimizations may be implement to make the virtual environment architecture 300 a backend for a higher concurrency of users.

An amount of concurrent players that may be supported by the virtual environment architecture 400 was determined to be around 1,000 users. Due to constraints of being able to have 1,000 users connect for a test, instances of 70 concurrent users were distribute cross a virtual environment such that the instances each are out of the view radius from one another. A problem with developing a high-concurrency infrastructure is coordinating 1,000 users, each with their own device and single player client copy, to simultaneously connect to the virtual environment server. Accordingly, a bot service to manage a plurality of bots may be used to connect the plurality of bots to the virtual environment server, which may act as legitimate user connections. Additionally, the bot service may couple the roles of the single player client and proxy server, connecting directly to the virtual environment server, and acting on behalf of a legitimate single player client. To the virtual environment server, a bot connection may appear to be identical to a real user of a single player client.

A benefit of the above-described virtual environment architectures may be higher player density. Accordingly, there may be a reduced cost by fine-tune controlling fidelity of individual players' experience. Another benefit may include is that the above-described the virtual environment architectures may allow for a plurality of different fidelities based on predetermined tier levels of respective users of single player client. For example, a user that does not pay for access to the virtual environment and/or pays an entrance price for access may receive a constrained experience with a limited field of view and/or a lower framerate and users in other higher predetermined tier levels may receive a higher quality experience while all users may be connected to the same virtual environment in parallel.

According to embodiments of the present disclosure, one or more virtual environment servers may be configured to store in a shared database and/or in a server cluster data of state data of chunks of world chunk data of a virtual environment.

The one or more virtual environment servers may monitor and/or receive state data of one or more users of single player clients located within a particular chunk. The one or more virtual environment servers may determine an area of interest of each of the one or more one or more users of the single player clients located within the particular chunk. The area of interest may be a field of view of the user of the virtual environment and/or may be an area around the user in which other users and/or objects in the virtual environment my affect the user. The area of interest may be with a predetermined radius and/or distance from the respective users and/or object within the chunk.

The one or more virtual environment servers may periodically monitor and/or periodically receive, from each user of the single player client, updated state data, the updated state data may indicate changes of state of the user located within the chunk. The virtual environment server may store and/or update the updated state data in a database of the virtual environment server for access during execution of the virtual environment. The period of monitoring and/or receiving may be a predetermined interval.

The updated state data may be transmitted and/or periodically transmitted to each of the one or more one or more users of the single player clients located within the particular chunk. The period of periodically transmitting the updated states may be a second predetermined interval, and the second predetermined interval may be the predetermined interval or a different interval than the predetermined interval. Additionally, and/or alternatively, the updated state data may be transmitted to each of the one or more one or more users of the single player clients located within the particular chunk based on a distance between the location of a particular user of the single player client and the location another user of a respective single player client. For example, if a first user of a respective single player client is a long distance from a second user of a respective single player, the updated state data may be transmitted over a longer predetermined interval. Conversely, if the first user of a respective single player client is a short distance from the second user of a respective single player, the updated state data may be transmitted over a shorter predetermined interval.

Figure 6:
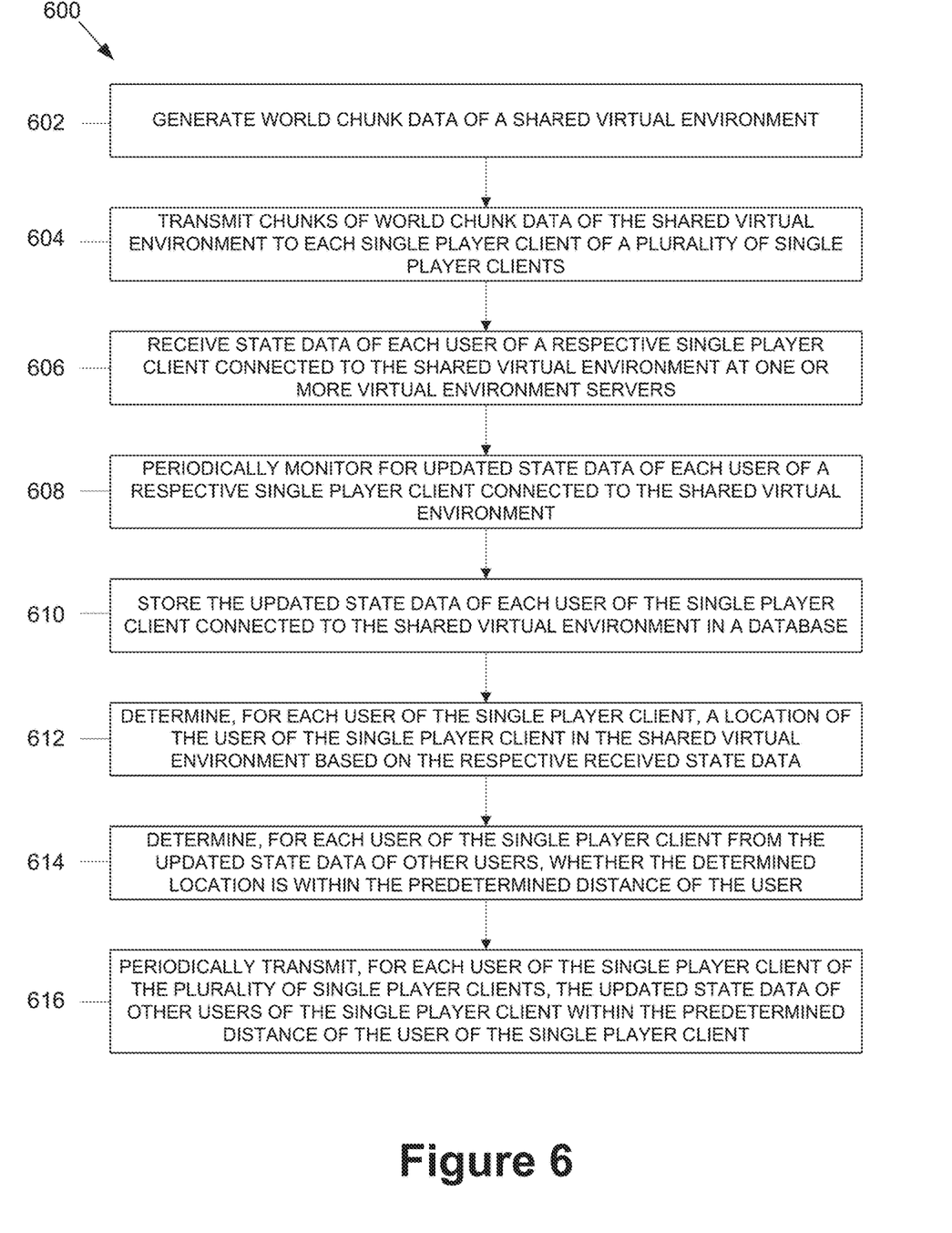
FIG. 6 depicts a flowchart of a method for improved concurrency of users of a shared virtual environment, according to embodiments of the present disclosure.

FIG. 6 depicts a flowchart of a computer-implemented method 600 for improved concurrency of users of a shared virtual environment, according to embodiments of the present disclosure. The algorithm, as shown in FIG. 6, may be performed in one or more of the computing environments discussed above and below, such as the devices and systems depicted in FIGS. 7 and 8, as well as other systems having different common backend architectures, such as those shown in FIGS. 1, 3, and 4.

The computer-implemented method 600 for improved concurrency of users of a shared virtual environment, may begin at step 602 in which world chunk data of a shared virtual environment may be generated. For example, all chunks of world chunk data of the shared virtual environment may be generated prior to transmitting chunks of world chunk data of the shared virtual environment. Alternatively, a portion of world chunk data of the shared virtual environment may be generated prior to transmitting chunks of world chunk data of a shared virtual environment. In this way, one or more virtual environment servers may implement a predetermined shared virtual environment and/or may control the generation of a random virtual environment server during execution of the shared virtual environment. The shared virtual environment may be a three dimensional virtual environment, such as a Minecraft game, and a chunk may comprise a three dimensional segment of the three dimensional virtual environment, the three dimensional segment may include one of a cube, a sphere, and/or a three dimensional shape.

After at least a portion of the shared virtual environment is generated, chunks of world chunk data of the shared virtual environment may be transmitted to each single player client of a plurality of single player clients at step 604. Then, at step 606, state data of each user of a respective single player client connected to the shared virtual environment may be received at one or more virtual environment servers from each single player client of the plurality of single player clients connected to the shared virtual environment. The single player client of each user may manage state data of the user within the one or more virtual environment servers.

At step 608, updated state data of a user of a respective single player client connected to the shared virtual environment may be periodically monitored from each user of the single player client of the plurality of single player clients connected to the shared virtual environment. Then, at step 610, the updated state data of each user of the single player client of the plurality of single player clients may be stored for the shared virtual environment in a database connected to one or more virtual environment servers. The storing of the updated state data for each user of the single player client of the plurality of single player clients may maintain associations to chunks of the world chunk data within predetermined distances of all users of respective single player clients, and may indicate when updated state data is to be transmitted to users of the single player client associated with the chunk.

Proceeding to step 612, for each user of the single player client of the plurality of single player clients, a location of the user of the single player client may be determined in the shared virtual environment based on the respective received state data of the user. Then, at step 614, for each user of the single player client of the plurality of single player clients from the updated state data of other users of the single player client, it may be determined whether the determined location is within the predetermined distance of the user of the single player.

For example, the predetermined distance may three chunks of the world chunk data, as mentioned above. Next, at step 616, the updated state data of other users of the single player client within the predetermined distance of the user of the single player client may be periodically transmitted for each user of the single player client of the plurality of single player clients. The periodically monitoring updated state data for the user of a respective single player client connected to the virtual environment may be performed for a first predetermined interval, and the periodically transmitting the updated state data of other users of the single player client within the predetermined distance of the user of the single player client may be performed for a second predetermined interval. The first predetermined interval and the second predetermined interval may be one of the same interval or different intervals. Alternatively, the periodically transmitting of the updated state data of other users of the single player client within the predetermined distance of the user of the single player client may be performed based on a distance between the location of a particular user of the single player client and the location another user of a respective single player client. For example, if a first user of a respective single player client is a long distance from a second user of a respective single player, the updated state data may be transmitted over a longer predetermined interval. Conversely, if the first user of a respective single player client is a short distance from the second user of a respective single player, the updated state data may be transmitted over a shorter predetermined interval.

Figure 7:
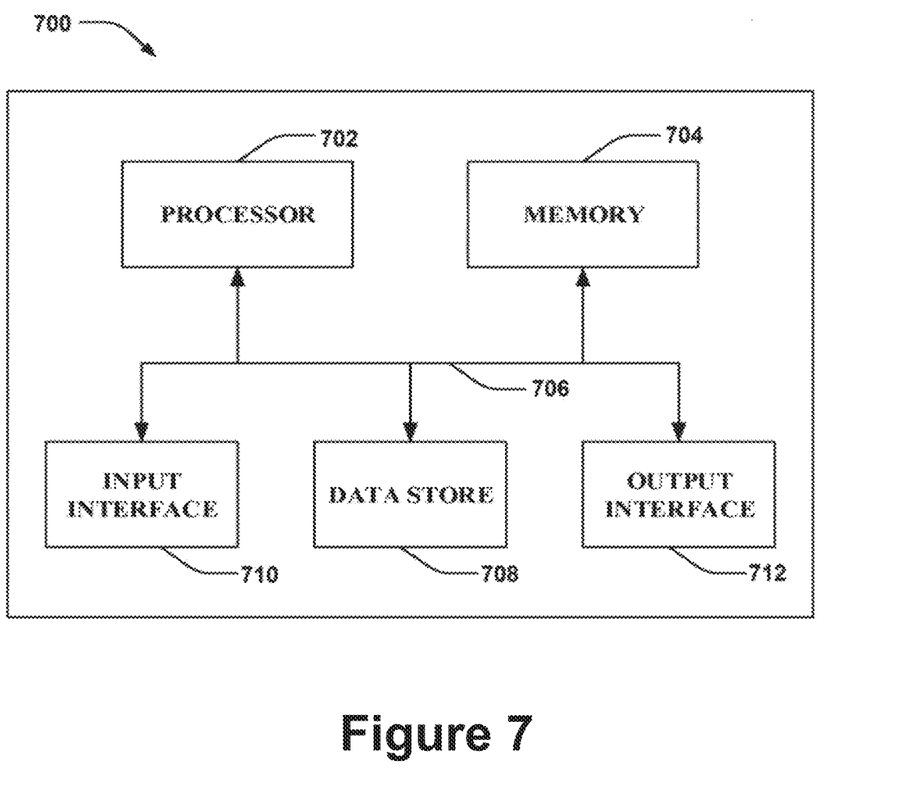
FIG. 7 depicts a high-level illustration of an exemplary computing device that may be used in accordance with the systems, methods, and computer-readable media disclosed herein, according to embodiments of the present disclosure.

FIG. 7 depicts a high-level illustration of an exemplary computing device 700 that may be used in accordance with the systems, methods, modules, and computer-readable media disclosed herein, according to embodiments of the present disclosure. For example, the computing device 700 may be used in a system that processes data, according to embodiments of the present disclosure. The computing device 700 may include at least one processor 702 that executes instructions that are stored in a memory 704. The instructions may be, for example, instructions for implementing functionality described as being carried out by one or more components discussed above or instructions for implementing one or more of the methods described above. The processor 702 may access the memory 704 by way of a system bus 706. In addition to storing executable instructions, the memory 704 may also store data and so forth.

The computing device 700 may additionally include a data store, also referred to as a database, 708 that is accessible by the processor 702 by way of the system bus 706. The data store 708 may include executable instructions, data, examples, features, etc. The computing device 700 may also include an input interface 710 that allows external devices to communicate with the computing device 700. For instance, the input interface 710 may be used to receive instructions from an external computer device, from a user, etc. The computing device 700 also may include an output interface 712 that interfaces the computing device 700 with one or more external devices. For example, the computing device 700 may display text, images, etc. by way of the output interface 712.

It is contemplated that the external devices that communicate with the computing device 700 via the input interface 710 and the output interface 712 may be included in an environment that provides substantially any type of user interface with which a user can interact. Examples of user interface types include graphical user interfaces, natural user interfaces, and so forth. For example, a graphical user interface may accept input from a user employing input device(s) such as a keyboard, mouse, remote control, or the like and may provide output on an output device such as a display. Further, a natural user interface may enable a user to interact with the computing device 1000 in a manner free from constraints imposed by input device such as keyboards, mice, remote controls, and the like. Rather, a natural user interface may rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 700 may be a distributed system. Thus, for example, several devices may be in communication by way of a network connection and may collectively perform tasks described as being performed by the computing device 700.

Figure 8:
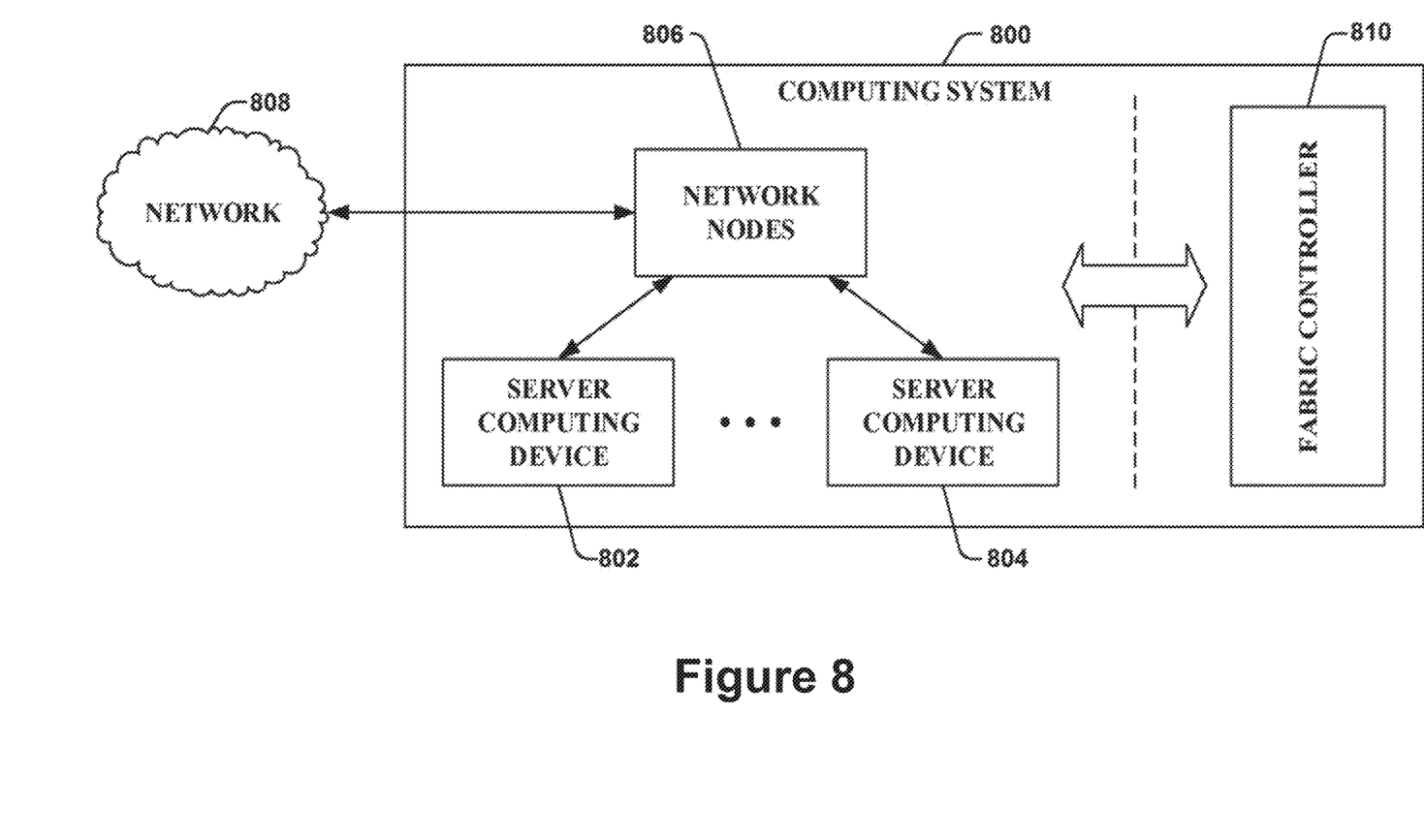
FIG. 8 depicts a high-level illustration of an exemplary computing system that may be used in accordance with the systems, methods, and computer-readable media disclosed herein, according to embodiments of the present disclosure.

Turning to FIG. 8, FIG. 8 depicts a high-level illustration of an exemplary computing system 800 that may be used in accordance with the systems, methods, modules, and computer-readable media disclosed herein, according to embodiments of the present disclosure. For example, the computing system 800 may be or may include the computing device 700. Additionally, and/or alternatively, the computing device 700 may be or may include the computing system 800.

The computing system 800 may include a plurality of server computing devices, such as a server computing device 802 and a server computing device 804 (collectively referred to as server computing devices 802-804). The server computing device 802 may include at least one processor and a memory; the at least one processor executes instructions that are stored in the memory. The instructions may be, for example, instructions for implementing functionality described as being carried out by one or more components discussed above or instructions for implementing one or more of the methods described above. Similar to the server computing device 802, at least a subset of the server computing devices 802-804 other than the server computing device 802 each may respectively include at least one processor and a memory. Moreover, at least a subset of the server computing devices 802-804 may include respective data stores.

Processor(s) of one or more of the server computing devices 802-804 may be or may include the processor, such as processor 702. Further, a memory (or memories) of one or more of the server computing devices 802-804 can be or include the memory, such as memory 704. Moreover, a data store (or data stores) of one or more of the server computing devices 802-804 may be or may include the data store, such as data store 708.

The computing system 800 may further include various network nodes 806 that transport data between the server computing devices 802-804. Moreover, the network nodes 806 may transport data from the server computing devices 802-804 to external nodes (e.g., external to the computing system 800) by way of a network 808. The network nodes 802 may also transport data to the server computing devices 802-804 from the external nodes by way of the network 808. The network 808, for example, may be the Internet, a cellular network, or the like. The network nodes 806 may include switches, routers, load balancers, and so forth.

A fabric controller 810 of the computing system 800 may manage hardware resources of the server computing devices 802-804 (e.g., processors, memories, data stores, etc. of the server computing devices 802-804). The fabric controller 810 may further manage the network nodes 806. Moreover, the fabric controller 810 may manage creation, provisioning, de-provisioning, and supervising of managed runtime environments instantiated upon the server computing devices 802-804.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Various functions described herein may be implemented in hardware, software, or any combination thereof. If implemented in software, the functions may be stored on and/or transmitted over as one or more instructions or code on a computer-readable medium. Computer-readable media may include computer-readable storage media. A computer-readable storage media may be any available storage media that may be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, may include compact disc ("CD"), laser disc, optical disc, digital versatile disc ("DVD"), floppy disk, and Blu-ray disc ("BD"), where disks usually reproduce data magnetically and discs usually reproduce data optically with lasers. Further, a propagated signal is not included within the scope of computer-readable storage media. Computer-readable media may also include communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio and microwave are included in the definition of communication medium. Combinations of the above may also be included within the scope of computer-readable media.

Alternatively, and/or additionally, the functionality described herein may be performed, at least in part, by one or more hardware logic components. For example, and without limitation, illustrative types of hardware logic components that may be used include Field-Programmable Gate Arrays ("FPGAs"), Application-Specific Integrated Circuits ("ASICs"), Application-Specific Standard Products ("ASSPs"), System-on-Chips ("SOCs"), Complex Programmable Logic Devices ("CPLDs"), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

What is claimed is:

1. A computer-implemented method for improved concurrency of users of a shared virtual environment, the method comprising:
providing, to each client device of a plurality of client devices, one or more chunks of world data from a plurality of chunks of world data, the plurality of chunks of world data corresponding to regions within a shared virtual environment, and wherein the one or more chunks provided to each client device corresponds to a location of each player within the shared virtual environment;
receiving, at one or more virtual environment servers from each client device of the plurality of client devices connected to the shared virtual environment, state data of each player of a plurality of players associated with respective client devices connected to the shared virtual environment, wherein each client device associated with each player manages state data of the respective players;
periodically monitoring, updated state data for each player associated with the plurality of client devices connected to the shared virtual environment;
storing, for the shared virtual environment in a database connected to one or more virtual environment servers, the updated state data for each player associated with the plurality of client devices; and
for a first player of the plurality of players, periodically transmitting, to a first client device associated with the first player, updated state data of other players that are within a predetermined distance of the first player within the shared virtual environment.

2. The method of claim 1, further comprising:
determining, for each client device of the plurality of client devices, a location of a corresponding player in the shared virtual environment based on the respective received state data of the player; and
determining, for each client device of the plurality of client devices, updated state data of other players associated with other client devices, whether the determined location is within the predetermined distance of the player associated with the client device.

3. The method of claim 1, wherein the predetermined distance is three chunks of the world chunk data.

4. The method of claim 1, wherein storing the updated state data for each player associated with the plurality of client devices includes maintaining associations to chunks of the world chunk data within predetermined distances of all players of respective client devices, and wherein the method further includes identifying when updated state data is to be transmitted to players of the respective client devices associated with the world chunk data.

5. The method of claim 1, wherein periodically monitoring updated state data for the user of a respective single player client connected to the virtual environment is performed for a first predetermined interval.

6. The method of claim 5, wherein periodically transmitting the updated state data of the other players that are within the predetermined distance of the first player within the shared virtual environment is performed for a second predetermined interval, the first predetermined interval and the second predetermined interval being one of the same interval or different intervals.

7. The method of claim 2, wherein periodically transmitting the updated state data of the other players that are within the predetermined distance of the first player within the shared virtual environment is performed based on a distance between the location of the first user and the location another player.

8. The method of claim 1, further comprising:
generating all chunks of world chunk data of the shared virtual environment prior to providing the one or more chunks of world chunk data to each client device of the plurality of client devices.

9. The method of claim 1, further comprising:
generating a portion of world chunk data of the shared virtual environment prior to providing the one or more chunks of world chunk data to each client device of the plurality of client devices.

10. The method of claim 1, wherein the shared virtual environment is a three dimensional virtual environment.

11. The method of claim 10, wherein a chunk comprises a three dimensional segment of the three dimensional virtual environment, and wherein the three dimensional segment includes one of a cube, a sphere, or a three dimensional shape.

12. A system for improved concurrency of users of a shared virtual environment, the system including:
a data storage device that stores instructions for improved concurrency of users of a shared virtual environment; and
a processor configured to execute the instructions to perform a method including:
providing, to each client device of a plurality of client devices, one or more chunks of world data from a plurality of chunks of world data, the plurality of chunks of world data corresponding to regions within a shared virtual environment, and wherein the one or more chunks provided to each client device corresponds to a location of each player within the shared virtual environment;
receiving, from each client device of the plurality of client devices connected to the shared virtual environment, state data of each player of a plurality of players associated with respective client devices connected to the shared virtual environment, wherein each client device associated with user player manages state data of the respective players;
periodically monitoring updated state data for each player associated with the plurality of client devices connected to the shared virtual environment;
storing, for the shared virtual environment in a database, the updated state data for each player associated with the plurality of client devices; and
for a first player of the plurality of players, periodically transmitting, to a first client device associated with the first player, updated state data of other players that are within a predetermined distance of the first player within the shared virtual environment.

13. The system according to claim 12, wherein the processor is further configured to execute the instructions to perform the method including:
determining, for each client device of the plurality of client devices, a location of a corresponding player in the shared virtual environment based on the respective received state data of the player; and
determining, for each client device of the plurality of client devices, updated state data of other players associated with other client devices, whether the determined location is within the predetermined distance of the player associated with the client device.

14. The system according to claim 12, wherein storing the updated state data for each player associated with the plurality of client devices includes maintaining associations to chunks of the world chunk data within predetermined distances of all players of respective client devices, and wherein the method further includes identifying when updated state data is to be transmitted to players of the respective client devices associated with the world chunk data.

15. The system according to claim 12, wherein periodically monitoring updated state data for the user of a respective single player client connected to the virtual environment is performed for a first predetermined interval.

16. The system according to claim 15, wherein periodically transmitting the updated state data of the other players that are within the predetermined distance of the first player within the shared virtual environment is performed for a second predetermined interval, the first predetermined interval and the second predetermined interval being one of the same interval or different intervals.

17. The system according to claim 13, wherein periodically transmitting the updated state data of the other players that are within the predetermined distance of the first player within the shared virtual environment is performed based on a distance between the location of the first user and the location another player.

18. A computer-readable storage device storing instructions that, when executed by a computer, cause the computer to perform a method for improved concurrency of users of a shared virtual environment, the method including:
    providing, to each client device of a plurality of client devices, one or more chunks of world data from a plurality of chunks of world data, the plurality of chunks of world data corresponding to regions within a shared virtual environment, and wherein the one or more chunks provided to each client device corresponds to a location of each player within the shared virtual environment;
    receiving, at one or more virtual environment servers from each client device of the plurality of client devices connected to the shared virtual environment, state data of each player of a plurality of players associated with respective client devices connected to the shared virtual environment, wherein the each client device associated with each player manages state data of the respective players;
    periodically monitoring, updated state data for each player associated with the plurality of client devices connected to the shared virtual environment;
    storing, for the shared virtual environment in a database connected to one or more virtual environment servers, the updated state data for each player associated with the plurality of client devices; and
    for a first player of the plurality of players, periodically transmitting, to a first client device associated with the first player, updated state data of other players that are within a predetermined distance of the first player within the shared virtual environment.

19. The computer-readable storage device according to claim 18, wherein the method further comprises:
    determining, for each client device of the plurality of client devices, a location of a corresponding player in the shared virtual environment based on the respective received state data of the player; and
    determining, for each client device of the plurality of client devices, updated state data of other players associated with other client devices, whether the determined location is within the predetermined distance of the player associated with the client device.

20. The computer-readable storage device according to claim 18, wherein storing the updated state data for each player associated with the plurality of client devices includes maintaining associations to chunks of the world chunk data within predetermined distances of all players of respective client devices, and wherein the method further includes identifying when updated state data is to be transmitted to players of the respective client devices associated with the world chunk data.

* * * * *